(12) United States Patent
Tripathi et al.

(10) Patent No.: US 7,607,168 B1
(45) Date of Patent: Oct. 20, 2009

(54) NETWORK INTERFACE DECRYPTION AND CLASSIFICATION TECHNIQUE

(75) Inventors: Sunay Tripathi, San Jose, CA (US); Nicolas G. Droux, San Jose, CA (US); Hsiao-Keng Jerry Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 918 days.

(21) Appl. No.: 11/112,436

(22) Filed: Apr. 22, 2005

(51) Int. Cl.
*G06F 9/00* (2006.01)
*G06F 17/00* (2006.01)
*G06F 19/00* (2006.01)

(52) U.S. Cl. ...................................................... 726/13
(58) Field of Classification Search .................... 726/13
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,157,955 A * | 12/2000 | Narad et al. | 709/228 |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,904,519 B2 * | 6/2005 | Anand et al. | 713/100 |
| 6,928,478 B1 * | 8/2005 | Gangadharan | 709/226 |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2003/0037154 A1 | 2/2003 | Poggio et al. | |
| 2005/0135243 A1 | 6/2005 | Lee et al. | |
| 2005/0138620 A1 | 6/2005 | Lewites | |
| 2005/0182853 A1 * | 8/2005 | Lewites et al. | 709/238 |
| 2006/0041667 A1 | 2/2006 | Ahn et al. | |
| 2006/0070066 A1 | 3/2006 | Grobman | |
| 2006/0174324 A1 | 8/2006 | Zur et al. | |
| 2008/0275989 A1 * | 11/2008 | Ebersole et al. | 709/225 |

OTHER PUBLICATIONS

Maassen et al., Efficient Java RMI for Parallel Programming, Nov. 2001, ACM Transactions on Programming Languages and Systems, vol. 23, No. 6, pp. 747-775.*
Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 pages).

* cited by examiner

*Primary Examiner*—Kambiz Zand
*Assistant Examiner*—William S Powers
(74) *Attorney, Agent, or Firm*—Osha • Liang LLP

(57) ABSTRACT

Encrypted data packets are received by a network interface card. The network interface card, upon determining that the received data packets are encrypted, directs the encrypted data packets to decryption hardware in the network interface card. The decryption hardware decrypts the encrypted data packets and forwards the decrypted data packets to a hardware classifier that classifies the decrypted data packets and directs the classified decrypted data packets to the appropriate receive resource(s) of the network interface card.

15 Claims, 6 Drawing Sheets

NETWORK INTERFACE DECRYPTION AND CLASSIFICATION TECHNIQUE

CROSS-REFERENCE TO RELATED APPLICATIONS

The present application contains subject matter that may be related to the subject matter in the following U.S. applications filed on Apr. 22, 2005 and assigned to the assignee of the present application: "Method and Apparatus for Managing and Accounting for Bandwidth Utilization Within A Computing System" Ser. No. 11/112,063; "Method and Apparatus for Consolidating Available Computing Resources on Different Computing Devices" Ser. No. 11/112,158; "Assigning Higher Priority to Transactions Based on Subscription Level" Ser. No. 11/112,222; "Method and Apparatus for Dynamically Isolating Affected Services Under Denial of Service Attack" Ser. No. 11/112,228; "Method and Apparatus for Improving User Experience for Legitimate Traffic of a Service Impacted by Denial of Service Attack" Ser. No. 11/112,322; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,367; "Dynamic Hardware Classification Engine Updating for a Network Interface" Ser. No. 11/112,368; "Network Interface Card Resource Mapping to Virtual Network Interface Cards" Ser. No. 11/112,584; "Method and Apparatus for Enforcing Resource Utilization of a Container" Ser. No. 11/112,629; "Method and Apparatus for Enforcing Packet Destination Specific Priority Using Threads" Ser. No. 11/112,910; "Method and Apparatus for Processing Network Traffic Associated with Specific Protocols" Ser. No. 11/112,934; and "Method and Apparatus for Enforcing Bandwidth Utilization of a Virtual Serialization Queue" Ser. No. 11/112,934.

BACKGROUND OF INVENTION

In modern computing environments, computer systems are often required to communicate with other computer systems to perform any one or more of a vast number of different functions. Such communication may involve one computer system requiring the services or resources of another computer system. Referring to FIG. 1, in cases where multiple computer systems are not or cannot be directly and physically connected to one another due to, for example, being in different or remote locations, communication among multiple computer systems 10, 12, 14, 16, 18, 20 is facilitated by one or more networks 22 (e.g., the Internet) to which the multiple computer systems 10, 12, 14, 16, 18, 20 are operatively connected.

When a computer system sends data to a network for subsequent transmission to another computer system, that data is typically sent as numerous packets of data that can be universally recognized and handled by at least those networks that play a role in facilitating the transfer of that data between the computer systems (the propagation of packets in one or more networks hereinafter referred to generally as "network traffic"). A packet is typically formed of a header portion and a payload portion. The header portion may include information regarding, for example, an address of the sending system, an address of the desired receiving system, a size of the packet, a transport protocol used to transmit the packet, or other information identifying or characterizing the packet. The payload portion includes the actual data (e.g., data needed by the receiving system to perform a particular computation) to be transmitted from the sending system over the network to the receiving system.

To facilitate the sending and receiving of network traffic, a computer system typically includes or is otherwise connected to a network interface such as, for example, a hardware component known as a "network interface card" (NIC). FIG. 2 shows a typical computing environment having a "host" system 30 in operative connection with a network interface card 32. As shown in FIG. 2, the host system 30 includes a computing resource (e.g., a central processing unit (CPU), a temporary data structure) 34 that is operatively connected to the network interface card 32.

The network interface card 32, which is connected to a network 36, includes a classifier 38, receive rings (e.g., first-in, first-out queues) 40 that are each associated with a set of buffers, and send rings 42 used to transmit outgoing network traffic. Incoming network traffic is analyzed by the classifier 38 and assigned to one of the receive rings 40 based on, for example, an identification (e.g., an internet protocol (IP) address) or connection type (e.g., transmission control protocol (TCP)) of a particular packet.

Upon assignment by the classifier 38 of a particular packet to one of the receive rings 40, the packet is forwarded to that receive ring and a corresponding interrupt may be issued to the computing resource 34 to indicate the receipt of new data. Depending on, for example, a priority attributed to a particular receive ring, the computing resource 34 may instantiate a thread or use a current thread to retrieve the new data forwarded to that particular receive ring. In other cases, the computing resource 34 may not actively retrieve new data forwarded to a particular receive ring, and instead, may simply wait for new data to be processed through that particular receive ring.

SUMMARY OF INVENTION

According to one aspect of one or more embodiments of the present invention, a system comprising: a host system having at least one virtual serialization queue; and a network interface operatively connected to a network and the host system and configured to hardware decrypt and classify an encrypted data packet received from the network, where the network interface is further configured to direct the hardware decrypted and classified data packet to at least one receive ring, and where the at least one receive ring is associated with the at least one virtual serialization queue.

According to one aspect of one or more embodiments of the present invention, a method of processing network traffic comprises: receiving a data packet from a network; determine whether the received data packet is encrypted; and if the received data packet is encrypted, (i) decrypting the received data packet in hardware of a network interface, (ii) classifying the decrypted data packet, and (iii) directing the decrypted data packet to an appropriate receive ring of the network interface based on the classifying.

According to one aspect of one or more embodiments of the present invention, a system comprises: a host system; and a network interface card connectable to a network and the host system, where the network interface card comprises (i) a hardware classifier configured to receive incoming data packets from the network, (ii) hardware decryptor logic configured to decrypt encrypted data packets received by the hardware classifier, where the hardware classifier is further configured to classify data packets decrypted by the hardware decryptor logic, and (iii) a plurality of receive rings to which decrypted and classified data packets are directed from the hardware classifier.

Other aspects and advantages of the invention will be apparent from the following description and the appended claims.

DETAILED DESCRIPTION

Figure 1:
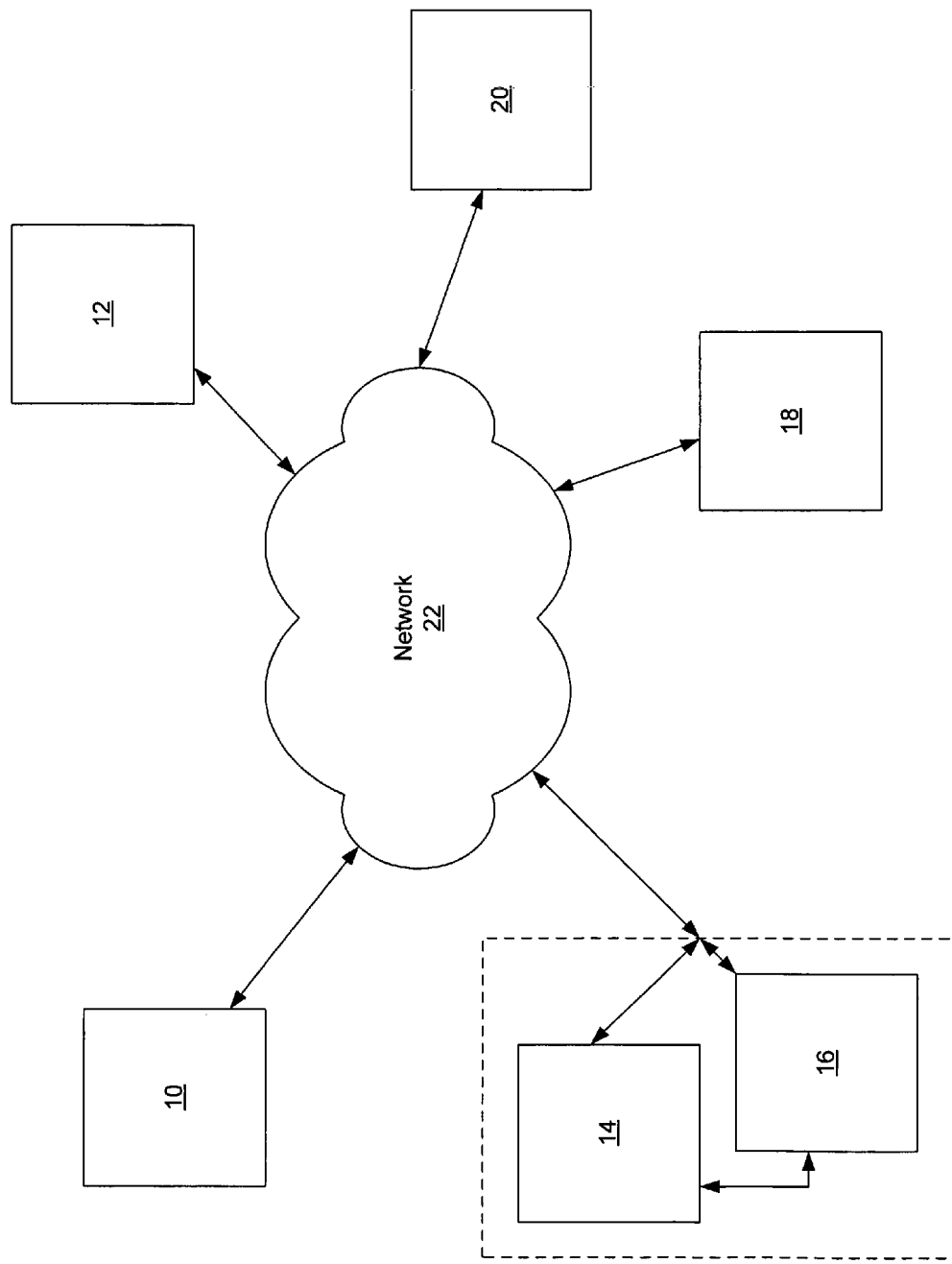
FIG. 1 shows a typical networked computing environment.
Figure 2:
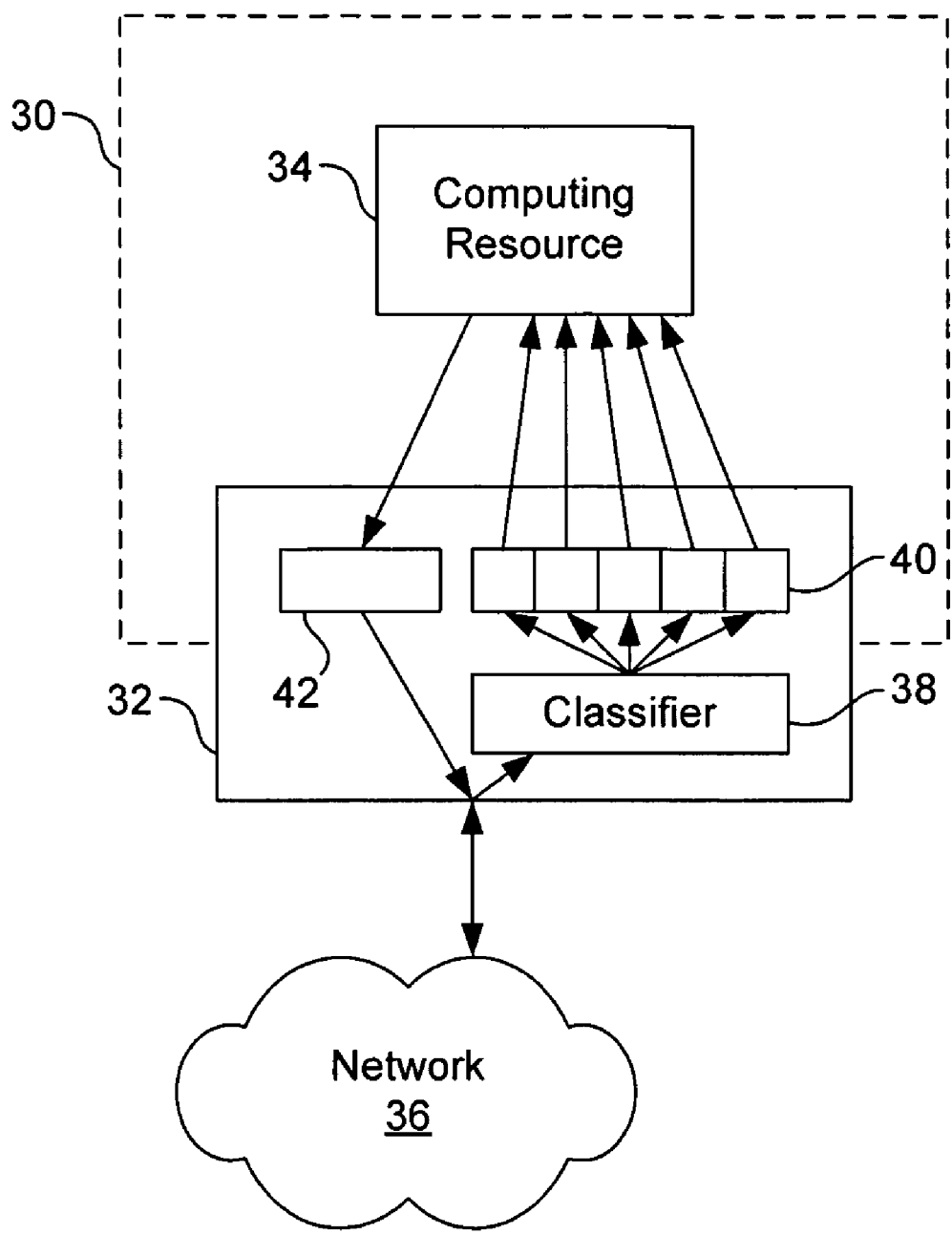
FIG. 2 shows a portion of a typical networked computing environment.

Exemplary embodiments of the present invention will be described with reference to the accompanying drawings. Like items in the drawings are shown with the same reference numbers. In the following description of the various embodiments of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the description of the present invention.

Embodiments of the present invention relate to a technique for processing network traffic in a computing environment in which multiple computing resources share a network interface.

Figure 3:
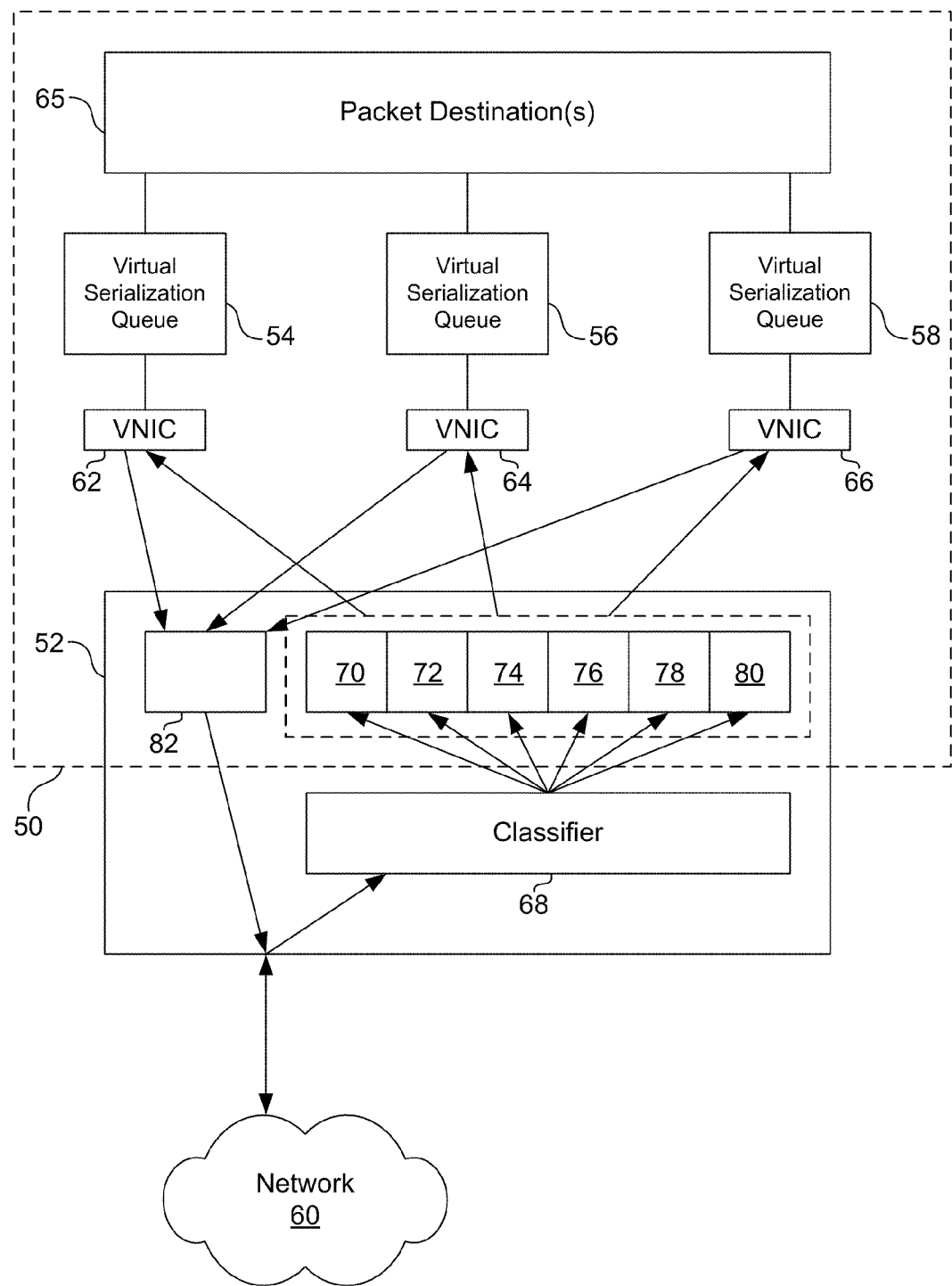
FIG. 3 shows a portion of a networked computing environment in accordance with an embodiment of the present invention.

FIG. 3 shows a portion of an exemplary computing environment in accordance with an embodiment of the present invention. In FIG. 3, a host system 50 is in operative connection with a network interface card 52. The host system 52 includes a plurality of virtual network interface cards 62, 64, 66 (each labeled in FIG. 3 as "VNIC") that are interfaced to a network (e.g., a local area network (LAN), a wide area network (WAN), a wireless network) 60 by the network interface card 52.

In one or more embodiments of the present invention, each virtual network interface card 62, 64, 66 is associated with at least one virtual serialization queue 54, 56, 58. Each serialization queue 54, 56, 58 corresponds to a data structure having at least two queues: an inbound queue and an outbound queue. Each of the queues within the virtual serialization queues 54, 56, 58 may be implemented as first-in, first-out (FIFO) queues. Further, each virtual serialization queue 54, 56, 58 may be configured to send and receive packets from associated virtual network interface cards 62, 64, 66. In addition, each virtual serialization queue 54, 56, 58 is configured to send and receive packets from one or more associated packet destinations (e.g., services, users, and/or containers of the host system 50) 65. Further, each virtual serialization queue 54, 56, 58 may be bound to a computing resource (e.g., a central processing unit (CPU)) (not shown) of the host system 50. Those skilled in the art will appreciate that any number of virtual serialization queues may be bound to a CPU. Further, those skilled in the art will appreciate that any number of virtual serialization queues may be bound to a virtual network interface card.

As described above, each of the plurality of virtual serialization queues 54, 56, 58 is respectively associated with a "virtual" network interface card 62, 64, 66 (each labeled in FIG. 3 as "VNIC"). The virtual network interface cards 62, 64, 66 provide an abstraction layer between the physical network interface card 52 and the various packet destinations (e.g., services, users, and/or containers of the host system 50) 65 present in the host system 50. In other words, each virtual network interface card 62, 64, 66 operates like a physical network interface card. For example, in one embodiment of the present invention, each virtual network interface card 62, 64, 66 may be associated with one or more Internet Protocol (IP) addresses, one or more ports, and/or configured to handle one or more protocol types. Thus, while the host system 50 may be operatively connected to a single physical network interface card 52, packet destinations 65 in the host system 50 operate as if each packet destination has its own physical network interface card.

The network interface card 52, which is connected to the network 60, includes a classifier (e.g., a hardware classifier) 68, receive rings (e.g., first-in, first-out queues) 70, 72, 74, 76, 78, 80 that are each associated with a set of buffers, and send rings 82 used to transmit outgoing network traffic. Incoming network traffic is analyzed by the classifier 68 and assigned to one of the receive rings 70, 72, 74, 76, 78, 80 based on, for example, an identification (e.g., a destination/source internet protocol (IP) address) or connection type (e.g., transmission control protocol (TCP)) of a particular packet.

As the percentage of encrypted network traffic over total network traffic continues to increase, embodiments of the present invention are arranged to efficiently handle encrypted network traffic. As described with reference to FIG. 3, the network interface card 52 is configured to receive and classify incoming data packets in order to route them to an appropriate receive ring 70, 72, 74, 76, 78, 80. Because at least one classification criteria may relate to a protocol type of a received packet, the network interface card 52 performs decryption of the received packet if the received packet is received in encrypted format. In other words, in an embodiment of the present invention and as further described below with reference to FIG. 4, the decryption of an encrypted received packets occurs in the network interface card 52 itself as opposed to, for example, being dependent on software for decryption or subsequent classification.

Those skilled in the art will note that without the capability for decryption upon receipt of an encrypted data packet, the classifier 68 may not be able to read and classify the received data packet and may instead direct all encrypted traffic to a particular set location (e.g., a default receive resource that is manipulated by software).

Figure 4:
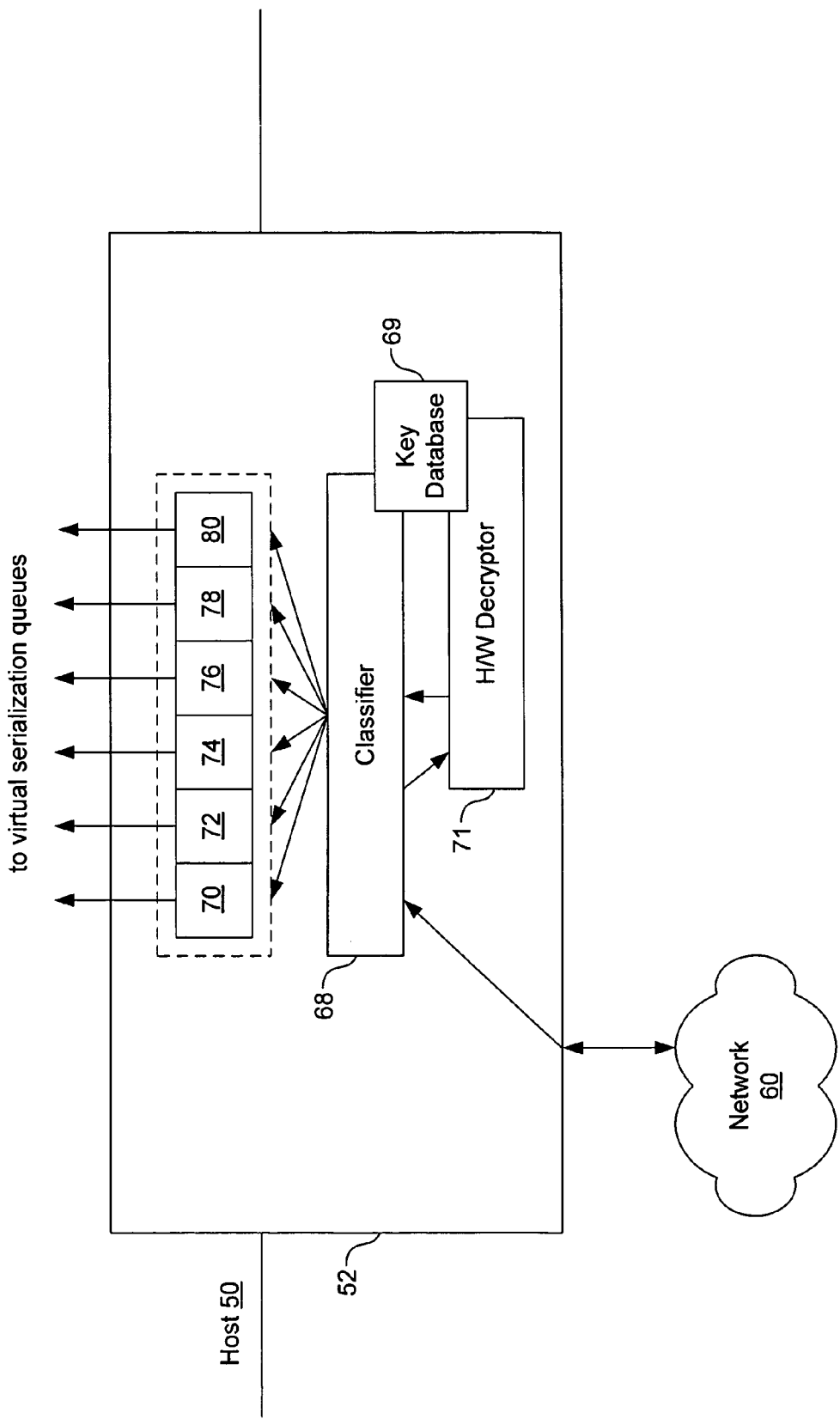
FIG. 4 shows a portion of a networked computing environment in accordance with an embodiment of the present invention.

FIG. 4, in accordance with an embodiment of the present invention, shows a portion of the portion of the networked computing environment shown in FIG. 3. As shown in FIG. 4, the network interface card 52 includes classifier 68. When an encrypted data packet is received by the network interface card 52, that encrypted data packet, like other non-encrypted packets, is initially received by the classifier 68. The classifier 68 is provided with enough functionality to recognize whether a receive packet is encrypted or not encrypted. If a received data packet is encrypted, the classifier 68 directs the encrypted data packet to hardware decryptor logic 71.

The hardware decryptor logic 71 uses, for example, a key database 69, to decrypt the encrypted data packet sent by the classifier 68. Upon decryption of the encrypted data packet by the hardware decryptor logic 71, the hardware decryptor logic 71 directs the now-decrypted data packet back to the classifier 68. The classifier 68 then (i) classifies the decrypted data packet as it normally would any received non-encrypted data packet and (ii) directs the decrypted data packet to the appropriate receive ring 70, 72, 74, 76, 78, 80. Thus, in essence, received encrypted traffic goes through at least two classification phases: an initial classification to determine whether a received packet is encrypted and a regular classification to classify and direct the received packet to the appropriate receive ring 70, 72, 74, 76, 78, 80.

Figure 5:
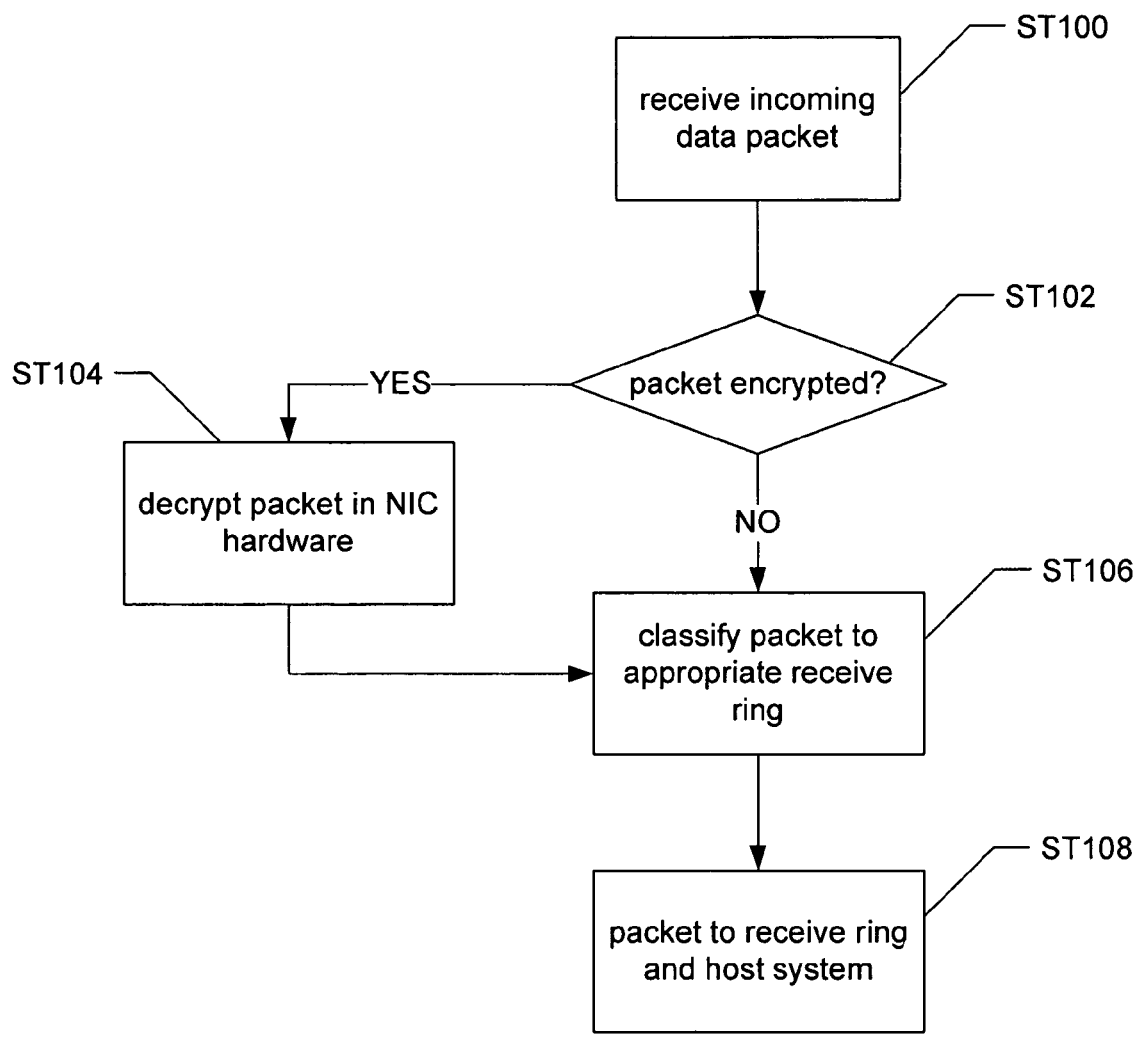
FIG. 5 shows a flow process in accordance with an embodiment of the present invention.

FIG. 5 shows an exemplary flow process in accordance with an embodiment of the present invention. As shown in FIG. 5, an incoming data packet to a network interface card is initially received ST100. Upon receipt of the incoming data packet in ST100, a determination is made as to whether the incoming data packet is encrypted ST102. If the incoming data packet is not encrypted, the data packet is (i) classified based on, for example, an identification (e.g., a destination/source internet protocol (IP) address) or connection type (e.g., transmission control protocol (TCP)), and (ii) associated with an appropriate receive ring of the network interface card ST106. Once classified in ST106, the data packet is directed to the appropriate receive ring, and subsequently, from that receive ring to a host system ST108.

If in ST102 it is determined that the incoming data packet is encrypted, the encrypted data packet is decrypted in hardware of the network interface card ST104. Once decrypted, the data packet is (i) classified based on, for example, an identification (e.g., a destination/source internet protocol (IP) address) or connection type (e.g., transmission control protocol (TCP)), and (ii) associated with an appropriate receive ring of the network interface card ST106. Once classified in ST106, the data packet is directed to the appropriate receive ring, and subsequently, from that receive ring to a host system ST108.

Figure 6:
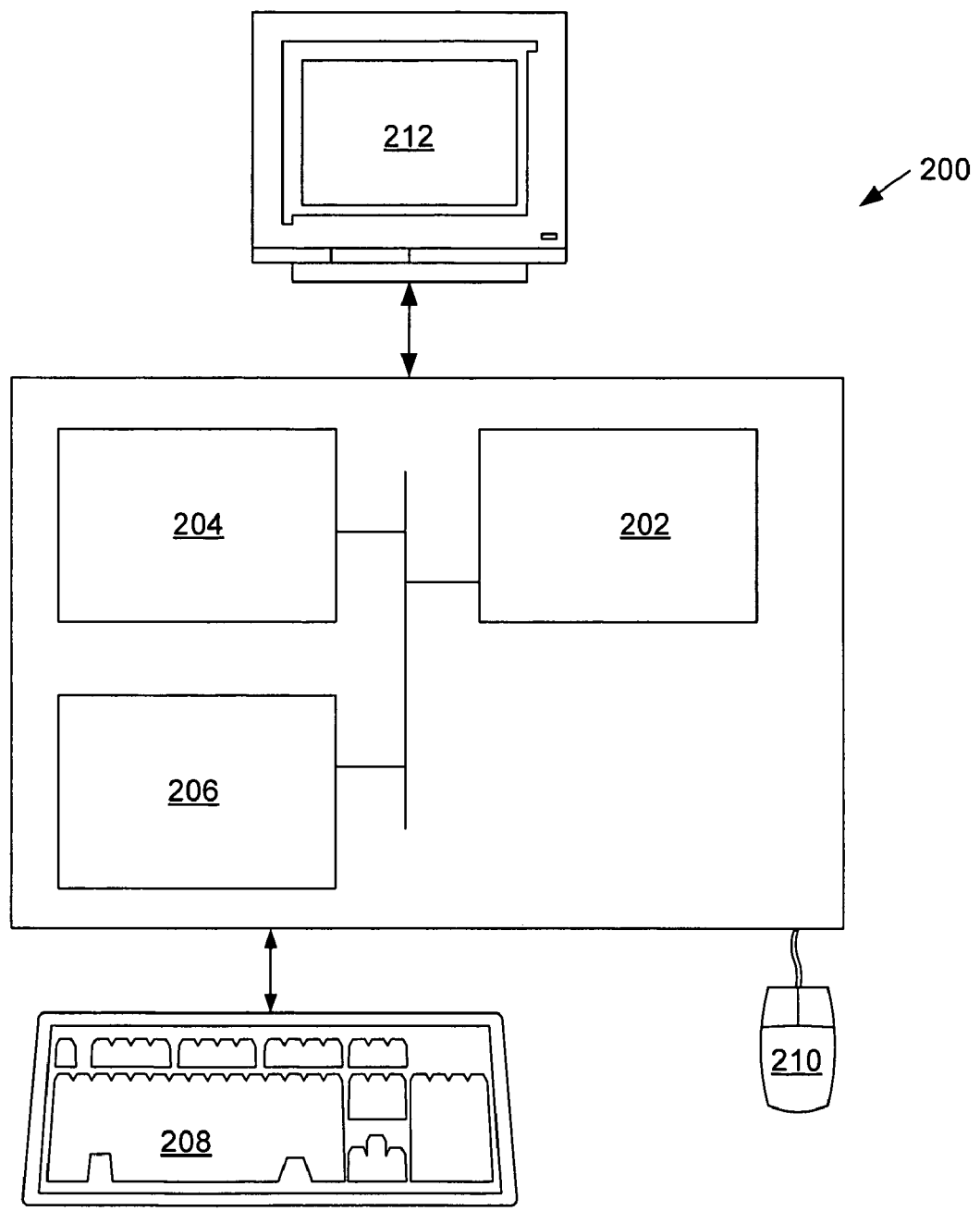
FIG. 6 shows a computer system in accordance with an embodiment of the present invention.

An embodiment of the present invention may be associated with virtually any type of computer system regardless of the platform being used. For example, as shown in FIG. 6, a networked computer system 200 includes a processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc (CD), a diskette, a tape, a file, or any other computer-readable storage device.

Advantages of the present invention may include one or more of the following. In one or more embodiments of the present invention, because traffic decryption and classification occurs in hardware of a network interface card, performance and efficiency hindrances resulting from a need to offload encrypted traffic for decryption and/or classification may be reduced or avoided.

In one or more embodiments of the present invention, encrypted network traffic may be processed by a network interface card and correctly directed to appropriate receive resources of the network interface card without dependence on software processing.

In one or more embodiments of the present invention, because network interface card hardware may be used to decrypt and classify encrypted network traffic, performance and/or efficiency of a system employing the network interface card may be increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
 a physical network interface card, operatively connected to a network, comprising a plurality of receive rings, and configured to:
 receive at least one packet from the network,
 determine whether the at least one packet is encrypted, and
 upon determining that the at least one packet is encrypted,
  decrypt the at least one packet to obtain at least one decrypted packet,
  classify the at least one decrypted packet to obtain at least one classified packet, and
  direct the at least one classified data packet to at least one of the plurality of receive rings; and
 a host system, operatively connected to the physical network interface card, comprising a plurality of virtual serialization queues and a plurality of virtual network interface cards operatively connected to the plurality of virtual serialization queues,
 wherein each of the plurality of virtual network interface cards is associated with a distinct internet protocol (IP) address,
 wherein each of the plurality of virtual network interface cards is associated with at least one of the plurality of receive rings, and
 wherein each of the plurality of virtual serialization queues is arranged to receive data packets from at least one of the plurality of receive rings.

2. The system of claim 1, wherein the physical network interface card further comprises a classifier implemented in hardware, wherein the classifier is configured to classify the at least one decrypted packet to obtain the at least one classified packet.

3. The system of claim 2, wherein the physical network interface card further comprises hardware decryptor logic operatively connected to the classifier and configured to decrypt the at least one packet to obtain at least one decrypted packet.

4. The system of claim 3, further comprising:
 a key database, wherein the hardware decryptor logic is configured to decrypt the at least one data packet based on information stored in the key database.

5. The system of claim 4, wherein the key database is included in the physical network interface card.

6. The system of claim 2, wherein the classifier is further configured to direct the at least one classified data packet to the at least one of the plurality of receive rings.

7. The system of claim 1, wherein each of the plurality of virtual serialization queues is associated with at least one selected from a group consisting of a service, a user, and a container of the host system.

8. The system of claim 1, the physical network interface card further comprising:
   at least one send ring configured to direct data packets received from the host system to the network.

9. A method of processing network traffic, comprising:
   receiving a data packet from a network;
   determining whether the received data packet is encrypted; and
   upon determining that the received data packet is encrypted,
      decrypting the received data packet in hardware of a physical network interface card,
      classifying the decrypted data packet,
      directing the decrypted data packet to one of a plurality of receive rings of the physical network interface card based on the classifying,
      directing the decrypted data packet in the one of a plurality of receive rings to one of a plurality of virtual network interface cards included in a host system, and
      directing the decrypted data packet in the one of the plurality of virtual network interface cards to one of a plurality of virtual serialization queues included in the host system,
         wherein each of the plurality of virtual network interface cards is associated with a distinct internet protocol (IP) address,
         wherein each of the plurality of virtual network interface cards is associated with at least one of the plurality of receive rings, and
         wherein each of the plurality of virtual network interface cards is associated with a respective one of the virtual serialization queues.

10. The method of claim 9, further comprising:
    upon determining that the received data packet is encrypted,
       directing the decrypted data packet in the one of the plurality of virtual serialization queues to at least one of a plurality of packet destinations in the host system.

11. The method of claim 9, wherein decrypting the received data packet in hardware of the physical network interface card is based on information stored in a key database.

12. The method of claim 9, wherein each of the plurality of virtual serialization queues is associated with at least one selected from a group consisting of a service, a user, and a container of the host system.

13. The method of claim 9, further comprising:
    sending data packets from the host system to the network.

14. A computer readable storage medium having software instructions embodied therein, the software instructions adapted to be executed to implement a method of processing network traffic, the method comprising:
    receiving a data packet from a network;
    determining whether the received data packet is encrypted; and
    upon determining that the received data packet is encrypted,
       decrypting the received data packet in hardware of a physical network interface card,
       classifying the decrypted data packet,
       directing the decrypted data packet to one of a plurality of receive rings of the physical network interface card based on the classifying,
       directing the decrypted data packet in the one of a plurality of receive rings to one of a plurality of virtual network interface cards included in a host system, and
       directing the decrypted data packet in the one of the plurality of virtual network interface cards to one of a plurality of virtual serialization queues included in the host system,
          wherein each of the plurality of virtual network interface cards is associated with a distinct internet protocol (IP) address,
          wherein each of the plurality of virtual network interface cards is associated with at least one of the plurality of receive rings, and
          wherein each of the plurality of virtual network interface cards is associated with a respective one of the virtual serialization queues.

15. The computer readable storage medium of claim 14, the method further comprising:
    upon determining that the received data packet is encrypted,
       directing the decrypted data packet in the one of the plurality of virtual serialization queues to at least one of a plurality of packet destinations in the host system.

* * * * *

UNITED STATES PATENT AND TRADEMARK OFFICE
CERTIFICATE OF CORRECTION

PATENT NO. : 7,607,168 B1
APPLICATION NO. : 11/112436
DATED : October 20, 2009
INVENTOR(S) : Tripathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twelfth Day of October, 2010

David J. Kappos
*Director of the United States Patent and Trademark Office*